(12) United States Patent
German et al.

(10) Patent No.: US 9,172,763 B2
(45) Date of Patent: Oct. 27, 2015

(54) METHOD AND APPARATUS FOR SERVER SIDE REMOTE DESKTOP RECORDATION AND PLAYBACK

(75) Inventors: Richard W. German, Carmel, IN (US); Tony E. Thompson, Leo, IN (US); Eric T. Marshall, Leo, IN (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 243 days.

(21) Appl. No.: 13/608,892

(22) Filed: Sep. 10, 2012

(65) Prior Publication Data

US 2013/0067020 A1    Mar. 14, 2013

Related U.S. Application Data

(60) Provisional application No. 61/533,027, filed on Sep. 9, 2011.

(51) Int. Cl.
*G06F 15/173* (2006.01)
*G06F 15/16* (2006.01)
*H04L 29/08* (2006.01)

(52) U.S. Cl.
CPC ............... *H04L 67/22* (2013.01); *H04L 67/02* (2013.01); *H04L 67/14* (2013.01); *H04L 67/148* (2013.01)

(58) Field of Classification Search
CPC .............................. H04L 67/14; H04L 67/148
USPC .................................................. 709/224, 228
See application file for complete search history.

(56) References Cited

U.S. PATENT DOCUMENTS

| | | | |
|---|---|---|---|
| 8,220,042 B2 * | 7/2012 | Hagiu et al. | 726/14 |
| 8,380,994 B2 * | 2/2013 | Rajan et al. | 713/178 |
| 2003/0142122 A1 | 7/2003 | Straut et al. | |
| 2007/0106692 A1 * | 5/2007 | Klein | 707/104.1 |
| 2007/0261097 A1 * | 11/2007 | Siegman et al. | 725/134 |
| 2008/0244081 A1 | 10/2008 | Elangovan et al. | |
| 2009/0183225 A1 * | 7/2009 | Malakapalli et al. | 726/1 |
| 2010/0064215 A1 * | 3/2010 | Portman et al. | 715/704 |
| 2011/0072067 A1 * | 3/2011 | Gartner et al. | 709/201 |

OTHER PUBLICATIONS

International Preliminary Examining Authority, International Preliminary Report on Patentability, including Applicant's Jul. 9, 2013 Response to ISA's Nov. 19, 2012 Written Opinion, for International Application No. PCT/US2012/54498, Oct. 1, 2013, 17 pages, United States Patent and Trademark Office, USA.

International Searching Authority, International Search Report and Written Opinion for International Application No. PCT/US2012/54498, Nov. 19, 2012, 9 pages, United States Patent and Trademark Office, USA.

\* cited by examiner

*Primary Examiner* — Hieu Hoang
(74) *Attorney, Agent, or Firm* — Kunzler Law Group (57) ABSTRACT

Various methods for server-side recordation and playback of a remote desktop session are provided. One example method may comprise receiving data related to a remote desktop protocol session. The method of this example embodiment may further comprise providing for storage of the data at a location other than the device associated with the remote desktop protocol client of the remote desktop protocol session. Furthermore, the method of this example embodiment may comprise receiving a request to reproduce the remote desktop protocol session. The method of this example embodiment may also comprise retrieving the data from storage. Additionally, the method of this example embodiment may comprise facilitating reproduction of at least a portion of the remote desktop protocol session based at least in part on the retrieved data. Similar and related example methods, apparatuses, systems, and computer program products are also provided.

18 Claims, 4 Drawing Sheets

FIG. 4

METHOD AND APPARATUS FOR SERVER SIDE REMOTE DESKTOP RECORDATION AND PLAYBACK

CROSS-REFERENCE TO RELATED APPLICATIONS

This application claims priority under 35 USC 119 to U.S. Provisional Application No. 61/533,027 filed Sep. 9, 2011, which is incorporated by reference herein in its entirety.

TECHNICAL FIELD

Embodiments of the present invention relate generally to remote desktop technology, and, more particularly, relate to methods, apparatus, and computer program products for server-side recordation and playback of a remote desktop session.

BACKGROUND

The computing industry, over time, has experienced a rapid growth and evolution. Not only have technological advancements led to new models of computing devices, but they have also led to developments in the systems and networks in which the computing devices operate and interact. Each new model of computing device, from mainframes and supercomputers to personal computers and mobile devices, has brought its own share of advantages as well as challenges.

Over the past several decades, computing has been transitioning from distributed systems (e.g. mainframes) to decentralized systems (e.g. personal computers). While the new decentralized, client-oriented personal computer model provided enhanced flexibility and convenience to users, it also resulted in inefficient usage of resources and unnecessary additional costs. For example, each personal computer required the processing power and storage capacity necessary for maximum, rather than typical, loads. As a result, the recent trend in computing has been to a centralized model where applications and data can be centrally managed, stored, and provisioned for the purpose of reducing costs and improving security and efficiency.

One emerging model, known as "the cloud," relies on the delivery of computing resources via a computer network. Services provided by the cloud may range from individual applications to the full functionality of an operating system. To facilitate delivery of these cloud services, some systems may rely at least partially on remote access technologies, such as remote desktop protocol (RDP). RDP allows a user to view and control a remotely running desktop or application over a network connection. Allowing remote control of remote desktops, applications, and even file systems, however, may expose the server to additional security risks and unauthorized access. In addition, errors or inefficiencies may arise from the actions of a user of an RDP service that could be corrected or improved with analysis from the server.

Therefore, a need exists in the art for a computing system that allows monitoring of an RDP session by the server so as to prevent or mitigate issues caused by security threats, errors, or inefficiencies arising from the RDP client.

SUMMARY

These and other needs are met by embodiments of the invention herein that provide for an RDP session to be monitored, recorded, and/or played back by the server. Systems, methods, apparatuses, and computer program products in accordance with various embodiments may provide several advantages to computing devices, computing device users, and network providers. Various embodiments permit an RDP session to be automatically recorded and monitored on the server side. Further advantages of certain embodiments allow the recordation of an RDP session to occur without knowledge by the user of the RDP client that the session is being recorded or monitored, without requiring additional storage or network capacity at the RDP client machine, without requiring further processing capacity at the RDP client machine, and/or without requiring installation of special software at the RDP client machine. In this regard, an administrator may monitor one or more RDP sessions live to detect misuse or unauthorized access of information, or play back all or portions of the RDP session in the future to determine the cause of an error or security breach.

Some example embodiments advantageously allow an RDP session to be recorded by a network entity located in the path from the RDP server to the RDP client. In this way, an administrator of a portal environment may monitor RDP sessions in which the portal environment does not control the RDP server. In yet other advantageous embodiments, only certain identified portions of the RDP session may be recorded, such as actions that are known to require a particular level of authorization or that are likely to result in errors or other issues. In other embodiments, the recorded sessions may be indexed to allow an administrator to search the recording for events of particular importance, such as those previously mentioned.

In an example embodiment, a method is provided, which may comprise receiving data related to a remote desktop protocol session. The method of this example embodiment may further comprise providing for storage of the data at a location other than the device associated with the remote desktop protocol client of the remote desktop protocol session. The method of this example embodiment may further comprise receiving a request to reproduce the remote desktop protocol session. Additionally, the method of this example embodiment may comprise retrieving the data from storage. The method of this example embodiment may further comprise facilitating reproduction of at least a portion of the remote desktop protocol session based at least in part on the retrieved data.

In another example embodiment, a system is provided. The example system may comprise a first device configured to operate a remote desktop protocol client. Furthermore, the example system may comprise a second device configured to operate a remote desktop protocol server. The system according to this example embodiment may further comprise a third device located in a network path between the first and second devices. The third device may be configured to receive and store data transmitted by the first and second devices during a remote desktop protocol session.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

DEFINITIONS

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a terminal apparatus, relay apparatus, or server, to perform various functions); and (c) circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, an integrated circuit in a terminal apparatus, relay apparatus, server, or other network device.

System

Figure 1:
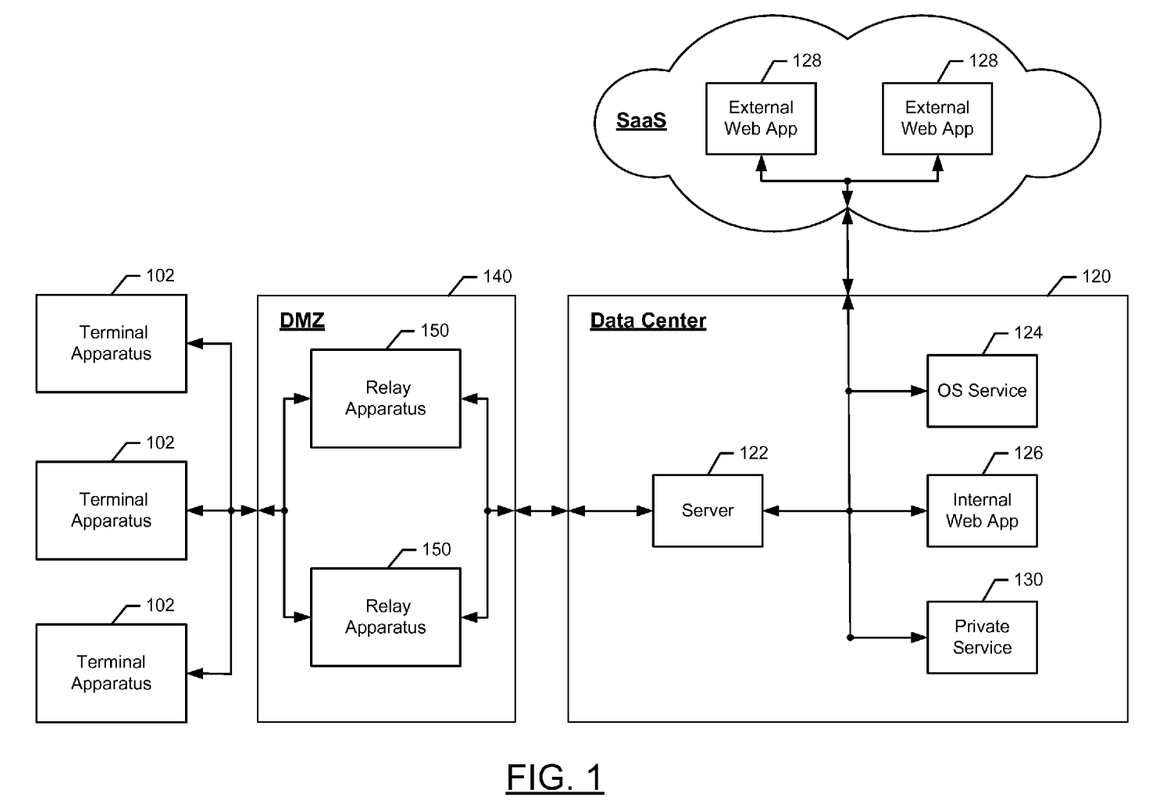
FIG. 1 illustrates a system for providing web-enabled delivery of a data center through a portal interface that would benefit from server side recordation and playback of a remote desktop session according to various embodiments of the present invention.

Referring now to FIG. 1, FIG. 1 illustrates a block diagram of an example system 100 for providing web-enabled delivery of a data center through a portal interface, such as a desktop built in a browser on a terminal apparatus 102, that would benefit from server side recordation and playback of a remote desktop session according to various embodiments of the present invention. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing web-enabled delivery of a data center through a portal interface, numerous other configurations may also benefit from various embodiments of the present invention.

In example embodiments, the system 100 may comprise a data center 120. The data center 120 may be configured to operate as a private cloud, public cloud, or a combination private and public cloud. For example, a public cloud may provide services to any user, whereas a private cloud may provide services to a subset of all users (e.g., employees of a particular business enterprise providing the private cloud services). The data center 120 may, in some instances, be protected by a firewall. In some embodiments, the data center 120 may be located on an internal network such as a private local area network (LAN) or the like, or the data center 120 may be remotely located and/or hosted by a third party. In some instances, the data center 120 may comprise a combination of entities and services residing both locally and remotely.

According to some embodiments, the data center 120 may comprise one or more servers 122. A server 122 may be embodied as any computing device, or in some instances may be embodied as a virtual server. A server 122 may also be embodied as a combination of a plurality of computing devices. In this regard, the server 122 may be embodied, for example, as a server cluster and/or may be embodied as a distributed computing system, which may be distributed across a plurality of computing devices. In other embodiments, one or more servers 122 may be embodied on the same computing device.

According to various embodiments, the system 100 may comprise a demilitarized zone (DMZ) 140 located external to the data center 120. In this regard, the DMZ 140 may be located external to the firewall protecting the data center 120. In example embodiments, the DMZ 140 may comprise one or more relay apparatuses 150. A relay apparatus 150 may be embodied as any computing device, such as, for example, a server computer (e.g. a network web server), desktop computer, laptop computer, or the like. In other embodiments, a relay apparatus 150 may be embodied as a virtual relay. According to some embodiments, the relay apparatuses 150 in the DMZ 140 and the data center 120 may be embodied on the same computing device.

The system 100, according to example embodiments, may comprise one or more terminal apparatuses 102. In various embodiments, the one or more terminal apparatuses 102 may be located external to the DMZ 140 and the data center 120. In this regard, the one or more terminal apparatuses 102 may be located external to the firewall protecting the data center 120. A terminal apparatus 102 may be embodied as any computing device, such as, for example, a desktop computer, laptop computer, netbook, tablet, portable digital assistant (PDA), mobile terminal, mobile computer, mobile phone, mobile communication device, smart phone, game device, television device, digital video recorder, positioning device, any combination thereof, and/or the like.

In certain embodiments, a terminal apparatus 102 may be configured to establish a connection with at least one of the one or more relay apparatuses 150 in the DMZ 140. In some embodiments, a terminal apparatus 102 connected to a first relay apparatus 150 may be transferred to a second relay apparatus 150 during the same session. The connection may be established, for example, over the Internet via a transport protocol such as Transmission Control Protocol (TCP), User Datagram Protocol (UDP), or the like. In these embodiments, the connection may be established via an application-specific protocol such as Hypertext Transfer Protocol (HTTP), Hypertext Transfer Protocol Secure (HTTPS), or the like. The connection may be, in certain embodiments, a secure connection. For example, communication over the connection between the terminal apparatus 102 and the relay apparatus 150 may be secured using Transport Layer Security (TLS), Secure Sockets Layer (SSL), or the like. Data transmitted and received over the connection may be encrypted using, for example, 128 bit SSL encryption.

According to various embodiments, a relay apparatus 150 in the DMZ 140 may be configured to establish a connection with at least one of the one or more servers 122 in the data center 120. For example, a relay apparatus 150 may be configured to establish a pipeline connection with a server 122. The pipeline connection may be configured, in example embodiments, to provide bidirectional communication between the relay apparatus 150 and the server 122. For example, the pipeline connection may be a serial connection, Ethernet connection, socket connection, or the like. The pipeline connection may be, in some embodiments, made through one or more ports, for example through a single port in a firewall protecting the data center 120.

A relay apparatus 150, in example embodiments, may serve as an intermediary between one or more terminal apparatuses 102 and one or more servers 122. In this regard, the relay apparatus 150 may serve as a terminal end point for all communications and requests from the terminal apparatus 102 to the data center 120. The relay apparatus 150 may relay the communications and requests from the terminal apparatus 102 to the server 122. Similarly, the relay apparatus 150 may receive all communications to the terminal apparatus 102 originating from the data center 120 via the pipeline connection with the server 122 and relay the communications to the terminal apparatus 102 via the secure connection. In this regard, the server 122 may be configured to communicate with the applications, file systems, and databases inside the data center 120.

According to various embodiments, the combination of the relay apparatus 150 and the server 122 may provide a two-tier architecture for securing the data center 120 from external users, for example a user at a terminal apparatus 102. In this regard, the relay apparatus 150 may provide a first tier of security for the data center 120 while the server 122 may provide a second tier of security for the data center 120. In other embodiments, a terminal apparatus may be configured to connect directly to the server 122 thereby forming a single tier architecture.

According to various embodiments, the data center 120 may be configured to provide information and services to one or more terminal apparatuses 102 via the architecture described above. Examples of the information and services that may be provided by the data center 120, according to certain embodiments, are described in further detail below.

In some embodiments, the data center 120 may be configured to provide operating system specific services 124. For example, the data center 120 may provide Windows™ applications, such as Word™, Excel™, PowerPoint™, or the like. An operating system specific service 124, in certain embodiments, may be delivered by a publishing method. In this regard, the operating system specific service 124 may be remotely delivered from a terminal server (e.g. Microsoft® Terminal Server) running inside the data center 120. In other embodiments, an operating system specific service 124 may be delivered via an application virtualization method. In this regard, the operating system specific service 124 may be bundled in an executable file and deployed dynamically to a terminal apparatus 102 for local processing. In other embodiments, an operating system specific service 124 may refer to a service or application installed locally at the terminal apparatus and directed to be executed by the data center 120.

In example embodiments, the data center 120 may be configured to provide internally hosted web applications 126. In this regard, the internal web applications 126 may be natively integrated into the data center 120. For example, the internal web applications 126 may comprise web applications configured to run over HTTP, HTTPS, or another similar protocol, such as web servers (e.g. Apache, IIS), web portals (e.g. Microsoft SharePoint®, BEA Weblogic®, IBM Websphere®, Oracle PeopleSoft®, Oracle Financials®), content management systems, web consoles, and/or the like. In some embodiments, the internal web applications 126 may be developed in-house or may be developed by third party vendors.

According to various embodiments, the data center 120 may be configured to provide externally hosted web applications 128. The external web applications 128 may comprise, for example, Software as a Service (SaaS) applications. In certain embodiments, an external web application 128 may be hosted by a third party, for example at a remote data center. For example, the external web applications 128 may comprise applications offered by Salesforce.com™ Google Apps™ Microsoft Live™, Zoho™, Moodle™, and/or the like. An external web application 128 may be delivered to the data center 120 via a trusted connection, for example using Security Assertion Markup Language (SAML), delegated authentication, and/or the like. In this regard, the external web applications 128 may be integrated into the data center 120 for delivery to the terminal apparatuses 102 via the servers 122 and, in certain embodiments, relay apparatuses 150.

In some embodiments, the data center 120 may be configured to provide private services 130, such as cloud services. In this regard, the private services 130 may comprise file services, data services, or the like. The file services, in certain embodiments, may provide access to one or more network file systems, for example shared directories, home directories, public directories, and/or the like. The data services, in example embodiments, may provide access to one or more databases. The databases may in some instances be any Open Database Connectivity (ODBC) or Java Database Connectivity (JDBC) database, such as Microsoft SQL (Structured Query Language) Server®, MySQL™, Oracle Database®, IBM DB2®, Microsoft Access®, and/or the like. The databases may be accessible, for example, by web reporting, electronic web forms, and/or the like.

According to various embodiments, the information and services of the data center 120 may be presented to a user of a terminal apparatus 102 via a desktop built in a browser. In this regard, the terminal apparatus 102 may be configured to provide a user with access to a web-enabled browser, for example Microsoft Internet Explorer®, Mozilla Firefox®, Google Chrome®, Opera®, Apple Safari®, and/or the like. In example embodiments, the user may be able to access a desktop using the browser of the terminal apparatus 102. In example embodiments, the desktop may be built on web technologies (e.g. Ajax, Comet, and the like) and generated natively at the browser in the terminal apparatus 102. In this regard, the desktop built in a browser may have features similar to a traditional desktop, such as menus, taskbars, desktop icons and background, custom settings, shortcuts, system tray, and/or the like. The desktop provided in the browser may be distinct from a traditional desktop provided by the operating system running on the terminal apparatus 102. Additionally, the desktop built in a browser may be distinct from a virtual presentation of a traditional desktop running at an external location, such as inside the data center 120. In some embodiments, the information and services of the data center 120 may be presented to a user of a terminal apparatus 102 via other portal interfaces, for example, a dashboard, mobile interface, tablet interface, or any other portal interface designed to provide access to one or more data center 120 and/or cloud services. Services and information may, in certain embodiments, be delivered directly to a user without the use of a portal interface.

Terminal Apparatus

Figure 2:
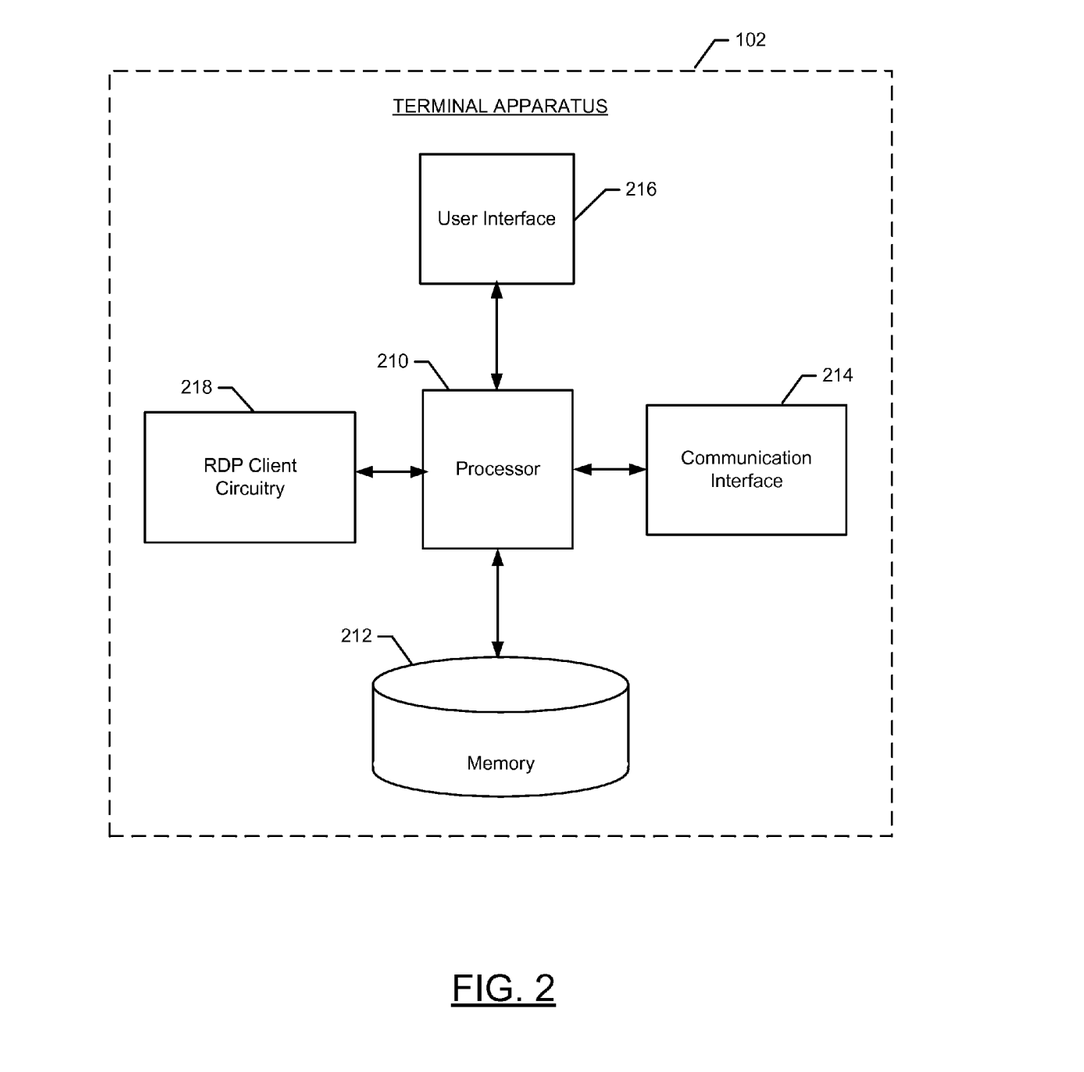
FIG. 2 illustrates a block diagram of a terminal apparatus according to some example embodiments of the present invention.

Referring now to FIG. 2, FIG. 2 illustrates a block diagram of a terminal apparatus 102 according to an example embodiment. In the example embodiment, the terminal apparatus 102 comprises various components for performing the various functions herein described including hosting a remote desktop client session. These components may comprise one or more of a processor 210, memory 212, communication interface 214, user interface 216, or RDP client circuitry 218. The components of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 212) that is executable by a suitably configured processing device (e.g., the processor 210), or some combination thereof.

In some example embodiments, one or more of the components illustrated in FIG. 2 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 210, memory 212, communication interface 214, user interface 216, and/or RDP client circuitry 218 may be embodied as a chip or chip set. The terminal apparatus 102 may therefore, in some example embodiments, be configured to implement embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute components for performing one or more operations for providing the functionalities described herein and/or for enabling user interface navigation with respect to the functionalities and/or services described herein.

The processor 210 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 2 as a single processor, in some embodiments the processor 210 comprises a plurality of processors. The plurality of processors may be in operative communication with each other and may be collectively configured to perform one or more functionalities of the terminal apparatus 102 as described herein. The plurality of processors may be embodied on a single computing device or distributed across a plurality of computing devices collectively configured to function as the terminal apparatus 102. In some example embodiments, the processor 210 is configured to execute instructions stored in the memory 212 or otherwise accessible to the processor 210. These instructions, when executed by the processor 210, may cause the terminal apparatus 102 to perform one or more of the functionalities of the terminal apparatus 102 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an executor of instructions, such as may be stored in the memory 212, the instructions may specifically configure the processor 210 to perform one or more algorithms and operations described herein.

The memory 212 may comprise, for example, volatile memory, non-volatile memory, or some combination thereof. In this regard, the memory 212 may comprise one or more tangible and/or non-transitory computer-readable storage media that may comprise volatile and/or non-volatile memory. Although illustrated in FIG. 2 as a single memory, the memory 212 may comprise a plurality of memories. The plurality of memories may be embodied on a single computing device or may be distributed across a plurality of computing devices collectively configured to function as the terminal apparatus 102. In various example embodiments, the memory 212 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 212 may be configured to store information, data, applications, instructions, or the like for enabling the terminal apparatus 102 to carry out various functions in accordance with various example embodiments. For example, in some example embodiments, the memory 212 is configured to buffer input data for processing by the processor 210. Additionally or alternatively, the memory 212 may be configured to store program instructions for execution by the processor 210. The memory 212 may store information in the form of static and/or dynamic information. This stored information may be stored and/or used by the RDP client circuitry 218 during the course of performing its functionalities.

The communication interface 214 may be embodied as any device or component embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. In an example embodiment, the communication interface 214 is at least partially embodied as or otherwise controlled by the processor 210. In this regard, the communication interface 214 may be in communication with the processor 210, such as via a bus. The communication interface 214 may comprise, for example, a network card (e.g. wired or wireless), an antenna, a transmitter, a receiver, and/or supporting hardware or software for enabling communications with one or more remote computing devices. The communication interface 214 may be configured to receive and/or transmit data using any protocol that may be used for communications between computing devices. In this regard, the communication interface 214 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 214 may be configured to enable communication between the terminal apparatus 102 and another device, such as a relay apparatus 150 or a server 122. The communication interface 214 may additionally be in communication with the memory 212, user interface 216, and/or RDP client circuitry 218, such as via a bus.

The user interface 216 may be in communication with the processor 210 to receive an indication of a user input and/or to provide an audible, visual, mechanical, or other output to a user. As such, the user interface 216 may comprise, for example, a keyboard, a mouse, a joystick, a display, a touch screen display, a microphone, a speaker, and/or other input/output mechanisms. In embodiments wherein the user interface 216 comprises a touch screen display, the user interface 216 may additionally be configured to detect and/or receive indication of a touch gesture or other input to the touch screen display. The user interface 216 may be in communication with the memory 212, communication interface 214, and/or RDP client circuitry 218, such as via a bus.

The RDP client circuitry 218 may be embodied as various components, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210. In embodiments wherein the RDP client circuitry 218 is embodied separately from the processor 210, the RDP client circuitry 218 may be in communication with the processor 210. The RDP client circuitry 218 may further be in communication with one or more of the memory 212, communication interface 214, or user interface 216, such as via a bus.

According to various embodiments, the RDP client circuitry 218 may be configured to receive a request from a user to log on to a portal environment system, such as a web based portal, to gain access to, for example, a data center and establish a remote desktop client session. The portal interface may be, for example, a desktop in a browser (also known as web desktop or webtop), dashboard, mobile interface, tablet interface, or any other portal interface designed to provide access to one or more data center and/or cloud services. The portal interface, in example embodiments, may provide one or more data center and/or cloud services via a remote desktop protocol (RDP) server, such as a terminal server. The RDP session may, in some instances, provide for delivery of a single service (e.g., an application) or, in other instances, provide for delivery of multiple services (e.g., remote desktop access).

In other embodiments, the RDP client circuitry 218 may receive a request from a user to connect directly to an RDP server. In this regard, the user may request that a specific service or application be delivered to the terminal apparatus 102 associated with the RDP client circuitry 218 via a server operating according to RDP, for example a terminal server. In various embodiments, the user may not be aware that the requested service is provided via an RDP server rather than locally by the RDP client circuitry 218.

The RDP session, in certain embodiments, may be a secure session. For example, the RDP session may operate according to a public key cryptography system. In this regard, data transmitted to and/or from the terminal apparatus 102 associated with the RDP client circuitry 218 may be securely transmitted.

According to example embodiments, the RDP client circuitry 218 may be configured to facilitate recordation of an RDP session. In this regard, the RDP client circuitry 218 may facilitate recordation of an RDP session related to a single application or a remote desktop session. Recording an RDP session may comprise, in example embodiments, recording at least a portion of the data transmitted in either or both directions between the RDP client executed by the RDP client circuitry 218 on the terminal apparatus 102 and the RDP server executed by the RDP session recording circuitry 316 on a serving network apparatus 104. However, the recording of an RDP session may also include recording data not typically transmitted or received by the RDP client during an unrecorded session, such as data received by video and audio devices associated with the terminal apparatus 102. The RDP client circuitry 218 may be configured to facilitate recordation without requiring installation of additional recording software on the terminal apparatus 102 associated with the RDP client circuitry 218.

The recorded data may include, in certain embodiments, sufficient information to reconstruct the session. For example, the data may include video frames, audio frames, user input (e.g., keystrokes, mouse input, and voice commands), events (e.g., login, logoff, file creation and storage, printing, and other RDP events), and/or the like. In some embodiments, only a subset of the data transmitted may be recorded. In various examples of these embodiments, redundant or unnecessary information may be removed from the data, the data may be compressed, or recordation may be limited to certain types of data. The data may be recorded using RDP events, video recording (e.g., Moving Picture Experts Group (MPEG) format or any other video format), and/or any other technique known in the art for recording an RDP session.

In example embodiments, the RDP client circuitry 218 may be configured to provide for transmission of the data to be recorded to a separate network entity, for example a serving network apparatus 104 such as a relay apparatus 150 or server 122. In other embodiments, the RDP client circuitry 218 may record the data locally without providing the data for transmission to a separate network entity. According to some embodiments, the RDP client circuitry 218 may provide for temporary storage of data to be recorded prior to transmission of the data. In other embodiments, the RDP client circuitry 218 may provide for transmission of the data immediately or shortly after it is available. For example, the RDP client circuitry 218 may buffer the data and provide for transmission of the data when the buffer is full. The RDP client circuitry 218 may, in another embodiment, provide for transmission of a first amount of data to the server 122, buffer a second amount of data while waiting for an acknowledgement of receipt of the data from the server (e.g., via a TCP/IP response), and provide for transmission of the second amount of data in the buffer once the acknowledgement is received. In yet other embodiments, the RDP client circuitry 218 may be configured to provide for transmission of the data to be recorded at a given interval (e.g., every five seconds). It should be noted that other methods for providing for transmission of the data to be recorded may be used without departing from the scope of the appended claims.

According to various embodiments, the RDP client circuitry 218 may be configured to associate a first timestamp with each item of data. In some instances, the RDP client circuitry 218 may associate a timestamp with the data based on the time at which the action represented by the data occurred. For example, if a user of the terminal apparatus 102 associated with the RDP client circuitry 218 provides input at a particular time, the RDP client circuitry 218 may associate a timestamp representing the particular time with the user input data prior to providing for transmission of the data to be recorded. In other embodiments, the RDP client circuitry 218 may associate a timestamp with the data based on the time at which the data to be recorded is provided for transmission. For example, in an embodiment in which the RDP client circuitry 218 is configured to provide for transmission of data to be recorded at a given interval, the data may be associated with a timestamp based on the interval indicating the time at which the data was provided for transmission.

In some embodiments, the RDP client circuitry 218 may be configured to provide for transmission of additional information with the data to be recorded. The RDP client circuitry 218 may, in example embodiments, associate with the data to be recorded an indication of the terminal apparatus 102 associated with the RDP client circuitry 218. According to certain embodiments, the RDP client circuitry 218 may provide for transmission of information related to the current operating environment of the terminal apparatus 102 associated with the RDP client circuitry 218. For example, the information may provide an indication of the currently executing applications, hardware configuration, current performance information (e.g., network throughput, CPU utilization, etc.), and/or the like.

According to various embodiments, the RDP client circuitry 218 may facilitate recordation of an RDP session automatically. In this regard, the RDP client circuitry 218 may automatically begin recording data or providing for transmission of data to be recorded upon initiation of the RDP session. In other embodiments, the RDP client circuitry 218 may be configured to detect certain conditions that trigger the automatic recordation. For example, the RDP client circuitry 218 may trigger recordation upon detecting a specific event, action, or input received from the RDP server or from a user of the terminal apparatus 102 associated with the RDP client circuitry 218. Similarly, the RDP client circuitry 218 may automatically terminate recordation of an RDP session. For example, the RDP client circuitry 218 may automatically stop recording upon termination of the RDP session or upon detecting an event, action, period of dormancy, or input configured to trigger automatic termination of the recording.

In example embodiments, the RDP client circuitry 218 may be configured to activate or terminate recording of an RDP session based on a command received from a network entity. For example, the RDP client circuitry 218 may receive an instruction from the RDP server, or an intervening network device, to take a particular action with respect to recordation of the RDP session.

Serving Network Apparatus

Figure 3:
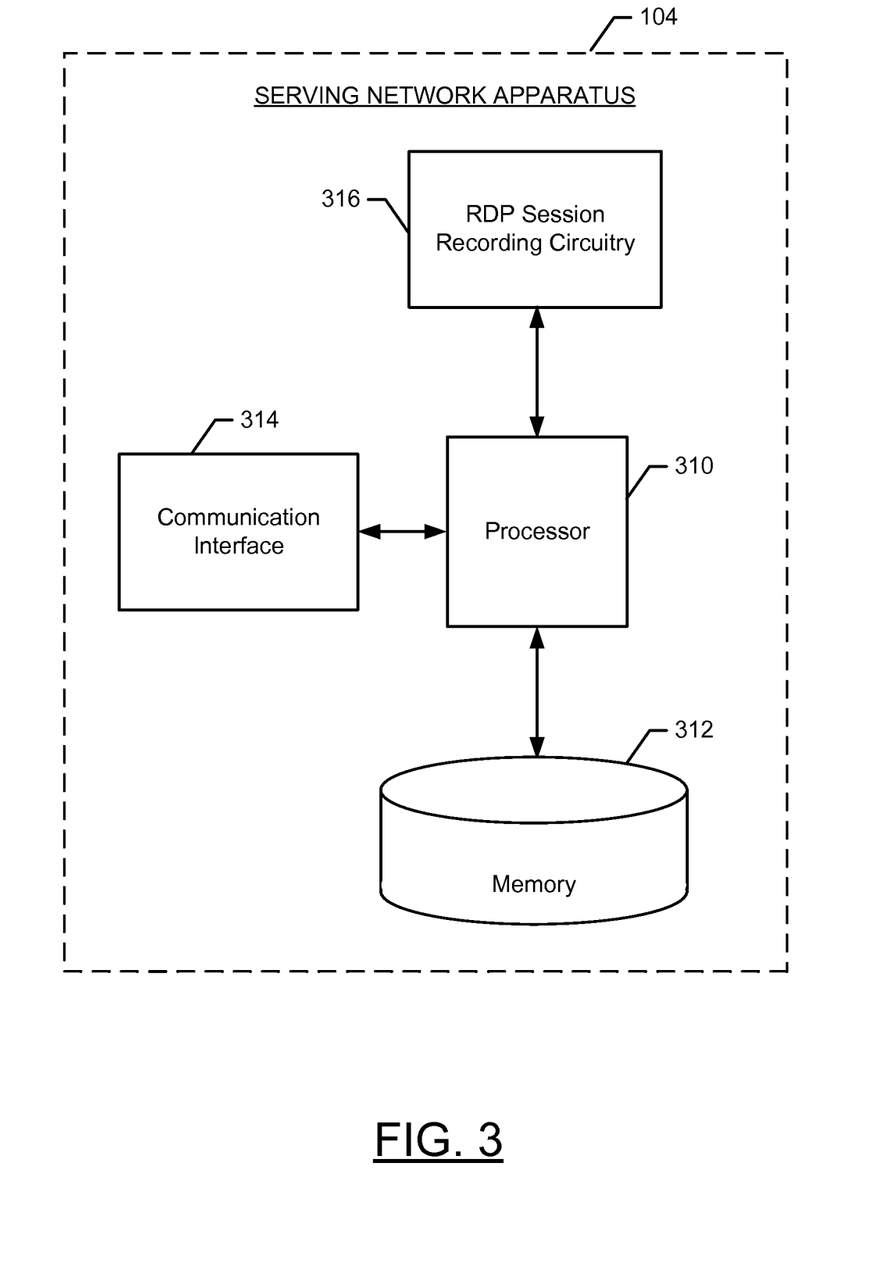
FIG. 3 illustrates a block diagram of a serving network apparatus according to some example embodiments of the present invention.

Referring now to FIG. 3, FIG. 3 illustrates a block diagram of a serving network apparatus 104 according to an example embodiment. In the example embodiment, the serving network apparatus 104 comprises various components for performing the various functions herein described. These components may comprise one or more of a processor 310, memory 312, communication interface 314, or RDP session recording circuitry 316. The components of the serving network apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 312) that is executable by a suitably configured processing device (e.g., the processor 310), or some combination thereof.

In some example embodiments, one or more of the components illustrated in FIG. 3 may be embodied as a chip or chip set. In other words, the serving network apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 310, memory 312, communication interface 314, and/or RDP session recording circuitry 316 may be embodied as a chip or chip set. The serving network apparatus 104 may therefore, in some example embodiments, be configured to implement embodiments of the present invention on a single chip or as a single "system on a chip." As another example, in some example embodiments, the serving network apparatus 104 may comprise component(s) configured to implement embodiments of the present invention on a single chip or as a single "system on a chip." As such, in some cases, a chip or chipset may constitute components for performing one or more operations for providing the functionalities described herein.

The processor 310 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 3 as a single processor, in some embodiments the processor 310 comprises a plurality of processors. The plurality of processors may be in operative communication with each other and may be collectively configured to perform one or more functionalities of the serving network apparatus 104 as described herein. The plurality of processors may be embodied on a single computing device or distributed across a plurality of computing devices collectively configured to function as the serving network apparatus 104. In some example embodiments, the processor 310 is configured to execute instructions stored in the memory 312 or otherwise accessible to the processor 310. These instructions, when executed by the processor 310, may cause the serving network apparatus 104 to perform one or more of the functionalities of the serving network apparatus 104 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an executor of instructions, such as may be stored in the memory 312, the instructions may specifically configure the processor 310 to perform one or more algorithms and operations described herein.

The memory 312 may comprise, for example, volatile memory, non-volatile memory, or some combination thereof. In this regard, the memory 312 may comprise one or more tangible and/or non-transitory computer-readable storage media that may comprise volatile and/or non-volatile memory. Although illustrated in FIG. 3 as a single memory, the memory 312 may comprise a plurality of memories. The plurality of memories may be embodied on a single computing device or may be distributed across a plurality of computing devices collectively configured to function as the serving network apparatus 104. In various example embodiments, the memory 312 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 312 may be configured to store information, data, applications, instructions, or the like for enabling the serving network apparatus 104 to carry out various functions in accordance with various example embodiments. For example, in some example embodiments, the memory 312 is configured to buffer input data for processing by the processor 310. Additionally or alternatively, the memory 312 may be configured to store program instructions for execution by the processor 310. The memory 312 may store information in the form of static and/or dynamic information. This stored information may be stored and/or used by the RDP session recording circuitry 316 during the course of performing its functionalities.

The communication interface 314 may be embodied as any device or component embodied in circuitry, hardware, a computer program product comprising computer readable program instructions stored on a computer readable medium (for example, the memory 312) and executed by a processing device (for example, the processor 310), or a combination thereof that is configured to receive and/or transmit data from/to another computing device. In an example embodiment, the communication interface 314 is at least partially embodied as or otherwise controlled by the processor 310. In this regard, the communication interface 314 may be in communication with the processor 310, such as via a bus. The communication interface 314 may comprise, for example, a network card (e.g. wired or wireless), an antenna, a transmitter, a receiver, and/or supporting hardware or software for enabling communications with one or more remote computing devices. The communication interface 314 may be configured to receive and/or transmit data using any protocol that may be used for communications between computing devices. In this regard, the communication interface 314 may be configured to receive and/or transmit data using any protocol that may be used for transmission of data over a wireless network, wireline network, some combination thereof, or the like by which the serving network apparatus 104 and one or more computing devices or computing resources may be in communication. As an example, the communication interface 314 may be configured to enable communication between the serving network apparatus 104 and another device, such as a relay apparatus 150 or a terminal apparatus 102. The communication interface 314 may additionally be in communication with the memory 312 and/or RDP session recording circuitry 316, such as via a bus.

The RDP session recording circuitry 316 may be embodied as various components, such as circuitry, hardware, a computer program product comprising computer readable program instructions stored on a computer readable medium (for example, the memory 312) and executed by a processing device (for example, the processor 310), or some combination thereof and, in some embodiments, is embodied as or otherwise controlled by the processor 310. In embodiments wherein the RDP session recording circuitry 316 is embodied separately from the processor 310, the RDP session recording circuitry 316 may be in communication with the processor 310. The RDP session recording circuitry 316 may further be in communication with one or more of the memory 312 and/or communication interface 314, such as via a bus.

According to various embodiments, the RDP session recording circuitry 316 may be associated with a serving network apparatus 104 embodied as a relay apparatus 150, server 122, or other network entity (e.g., a router or switch). The RDP session recording circuitry 316 may be configured to receive a request for access to an RDP session, for example from a terminal apparatus 102. In some embodiments, the RDP session recording circuitry 316 may be configured to provide the functionality of an RDP server. In this regard, the RDP session recording circuitry 316 may provide for establishment of an RDP session with the terminal apparatus 102 as requested. The RDP session, in certain embodiments, may be a secure session. For example, the RDP session may operate according to a public key cryptography system. In this regard, data transmitted to and/or from the serving network apparatus 104 associated with the RDP session recording circuitry 316 may be securely transmitted.

In example embodiments, the RDP session recording circuitry 316 may be configured to receive RDP session related data to be recorded, for example from a terminal apparatus 102 with which the RDP session is established. The data (examples of which are described above with respect to the terminal apparatus 102) received by the RDP session recording circuitry 316 may include, for example, events, actions, and inputs related to the RDP session originating at the terminal apparatus 102. According to some embodiments, the received data may include data previously transmitted by the RDP session recording circuitry 316 to the terminal apparatus 102 as part of the RDP session. In other embodiments, the RDP session recording circuitry 316 may be configured to record the data originating from the RDP session recording circuitry 316 as part of the RDP session without requiring the terminal apparatus 102 to transmit the data back to the RDP session recording circuitry 316 as part of the recording process.

According to example embodiments, the RDP session recording circuitry 316 may be configured to record the data related to the RDP session. In this regard, the RDP session recording circuitry 316 may provide for storage of the data received from the terminal apparatus 102 and/or recorded by the RDP session recording circuitry 316 such as in the memory 312. The RDP session recording circuitry 316 may, in certain embodiments, compress the data and/or remove redundant or unnecessary data prior to storage. In other embodiments, the received data may have been compressed or adjusted by the terminal apparatus 102 prior to transmission.

The memory 312 may be configured to permanently record all data related to the RDP session. To the extent additional, redundant, or alternative memory is needed, the RDP session recording circuitry 316 may arrange for storage in memory outside of the server network apparatus 104. The RDP session recording circuitry 316 may also be configured to record only the newest data related to the RDP session with the oldest data being recorded over as the memory 312 reaches a certain limit.

According to some embodiments, the data received by the RDP session recording circuitry 316 may include an indication of the terminal apparatus 102 from which it originated. In other embodiments, the data may include an indication of the RDP session to which it relates.

In certain embodiments, the RDP session recording circuitry 316 may be associated with a serving network apparatus 104 configured to operate as an intervening network entity (e.g., a router or a switch) between the RDP server and RDP client participating in an RDP session. In these embodiments, the RDP session recording circuitry 316 may be configured to record all data transmitted between the RDP server and RDP client during the RDP session. According to some of these example embodiments, the RDP session recording circuitry 316 may be configured to provide for storage of the recorded session or to provide the RDP session data to another network entity for storage. In some embodiments, one or more of the RDP server and RDP client may be unaware that the RDP session recording circuitry 316 is recording the RDP session. In embodiments where the communications between the RDP server and RDP client are secure, the RDP session recording circuitry 316 may receive encryption keys from one or both of the serving network apparatus 104 operating as the RDP server and the terminal apparatus 102 operating as the RDP client in order to decrypt and record the communications. In some embodiments, the RDP session recording circuitry 316 may prevent an RDP client from establishing an RDP session with an RDP server unless the encryption keys are provided. In this regard, the RDP session recording circuitry 316 may guarantee that a user establishes an RDP session with an RDP server that may be recorded.

In various embodiments, the RDP session recording circuitry 316 may be configured to associate a timestamp with the recorded data. In embodiments in which the terminal apparatus 102 associates a timestamp with the data prior to transmitting the data to the RDP session recording circuitry 316, the timestamp associated with the data by the RDP session recording circuitry 316 may be a second timestamp. The second timestamp may indicate a time at which the data is recorded by the RDP session recording circuitry 316. In some embodiments, the time source of the first timestamp and the second timestamp are different and may be unsynchronized. For example, one time source may be fast or slow with respect to an absolute time source, or each time source may be operating in different time zones.

According to example embodiments, the RDP session recording circuitry 316 may be configured to index the recorded data. For example, the RDP session recording circuitry 316 may index the recorded data based on the first and/or second timestamps, the originating terminal apparatus 102, other information related to the originating terminal apparatus 102 (e.g., currently executing applications, hardware configuration, and/or current performance information), type of event, content of the data (e.g., particular HTML tags), ports used during the RDP session, and/or the like. The indexing performed by the RDP session recording circuitry 316 may provide for enhanced retrieval and playback of the recorded data.

In example embodiments, the RDP session recording circuitry 316 may be configured to provide for playback of the recorded RDP session. In this regard, the RDP session recording circuitry 316 may be configured to retrieve the recorded data from storage or from another network entity configured to store the data. The RDP session recording circuitry 316 may provide controls allowing a user to play, pause, forward, rewind, and/or the like. The RDP session recording circuitry 316 may, in certain embodiments, provide for playback of particular portions of the RDP session. For example, the RDP session recording circuitry 316 may provide for determining a relevant portion of the RDP session for playback based at least in part on the time of the session and/or other information used to index the recorded data as described above.

According to some embodiments, the RDP session recording circuitry 316 may be configured to provide for playback of the recorded RDP session via an RDP client. In these embodiments, the RDP client may receive input from the recorded RDP session data. For example, the recorded data may include the events and other data provided to the RDP client by the RDP server during the session. In some embodiments, input to the RDP client may be suppressed during playback to avoid altering the original recorded RDP session. The RDP session recording circuitry 316 may, in example embodiments, ignore the original user input provided to the RDP client during the RDP session when playing back the recorded data. In these embodiments, the original user input may not be required for playback as the resulting events and information provided to the RDP client by the RDP server in response to the original user input provide sufficient information to reconstruct the RDP session.

In various embodiments, the RDP session recording circuitry 316 may use the first and/or second timestamps to facilitate playback. In embodiments where the first timestamp is used, the playback may occur at a rate proportional to the rate that the events, actions, and inputs occurred at the RDP client. In embodiments where the second timestamp is used, the playback may occur at a rate proportional to the rate at which the data was received by the server recording the RDP session. In these embodiments, the playback may not be equivalent to the rate at which the events, actions, and inputs occurred in real time due to network delays and congestion occurring during transmission of the data to the server recording the RDP session.

Examples

The following provides a non-limiting example of one embodiment and should not be construed to narrow the scope or spirit of the disclosure in any way. In this example, a user attempts to open a Microsoft Word® document on the user's laptop via a desktop in a browser portal environment system. In this example, the portal environment may decide to provide the Microsoft Word® application via a terminal server operating according to RDP. Upon establishment of the RDP session, the RDP server operating in the data center of the portal environment system begins recording all data transmitted by the RDP server and all data received from the RDP client operating on the user's laptop. For example, the RDP server saves all events transmitted by the RDP server, all keystrokes entered by the user at the RDP client, and copies of documents saved by the user during the RDP session. The RDP server also compresses and indexes the data as it is recorded. The recording may terminate once the user closes the Microsoft Word® application.

According to this example, an administrator may wish to review the recording of the RDP session at a later time. The administrator may access the recorded session at the recording device or remotely from another device. During playback, the administrator may view the entire session as seen from the RDP client, or the administrator may skip to particular portions of the session based on timestamps or indexed events. The administrator may also fast forward, rewind, or pause the session during playback as desired.

In this example, the original user may not be aware that the session was recorded or viewed by the administrator. In fact, the user may not be aware that the Microsoft Word® application was being served via RDP rather than locally. By recording the session remotely, the user would not have been required to install any additional recording software on the laptop. Furthermore, the user would not have necessarily noticed slower operation of his Microsoft Word® session or laptop because the RDP session data was not stored or processed locally at the laptop nor was increased network traffic beyond standard operation required.

Figure 4:
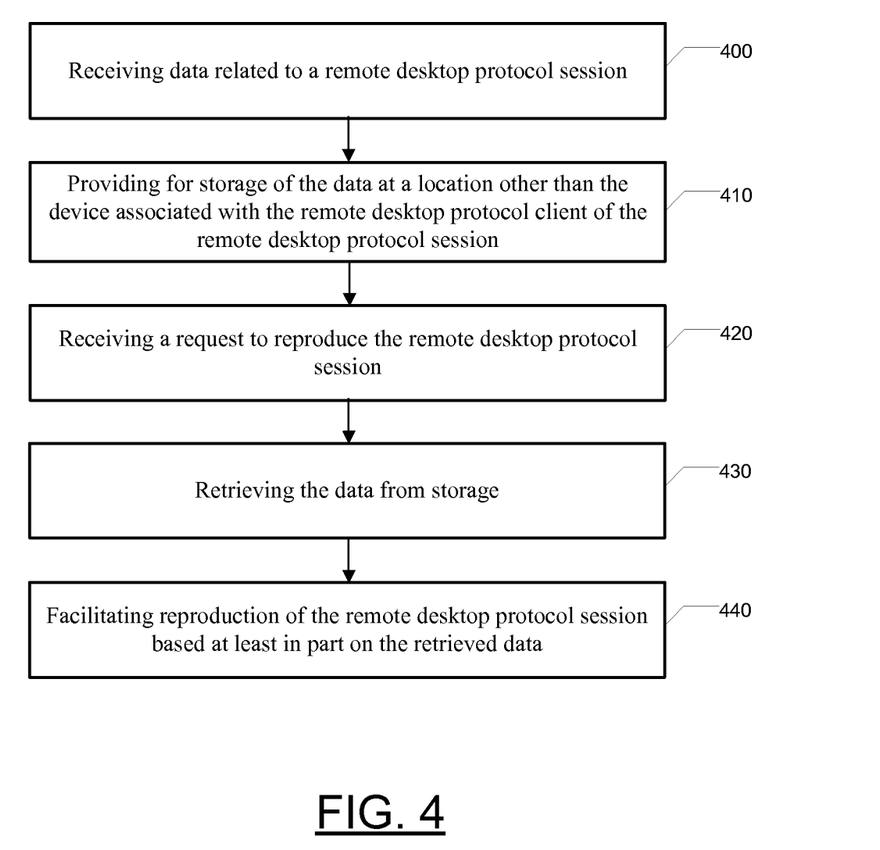
FIG. 4 illustrates a flowchart according to an example method for providing server-side recordation and playback of a remote desktop session according to some example embodiments of the present invention.

FIG. 4 illustrates a flowchart according to an example method for providing server-side recordation and playback of a remote desktop session according to an example embodiment. In this regard, FIG. 4 illustrates operations that may be performed at a serving network apparatus 104. The operations illustrated in and described with respect to FIG. 4 may, for example, be performed by, with the assistance of, and/or under the control of one or more of the processor 310, memory 312, communication interface 314, or RDP session recording circuitry 316. Operation 400 may comprise receiving data related to a remote desktop protocol session. The processor 310, memory 312, communication interface 314, or RDP session recording circuitry 316 may, for example, provide structure for performing operation 400. Operation 410 may comprise providing for storage of the data at a location other than the device associated with the remote desktop protocol client of the remote desktop protocol session. The processor 310, memory 312, communication interface 314, or RDP session recording circuitry 316 may, for example, provide structure for performing operation 410. Operation 420 may comprise receiving a request to reproduce the remote desktop protocol session. The processor 310, memory 312, communication interface 314, or RDP session recording circuitry 316 may, for example, provide structure for performing operation 420. Operation 430 may comprise retrieving the data from storage. The processor 310, memory 312, communication interface 314, or RDP session recording circuitry 316 may, for example, provide structure for performing operation 430. Operation 440 may comprise facilitating reproduction of at least a portion of the remote desktop protocol session based at least in part on the retrieved data. The processor 310, memory 312, communication interface 314, or RDP session recording circuitry 316 may, for example, provide structure for performing operation 440.

FIG. 4 illustrates a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 212 or memory 312) of a terminal apparatus, server, relay apparatus, or other computing device (e.g., the terminal apparatus 102) and executed by a processor (e.g., the processor 210 or processor 310) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, supports combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In one embodiment, a suitably configured processor (for example, the processor 210, and/or processor 310) may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium (for example, the memory 212 and/or memory 312), and computer-readable program code portions, such as a series of computer instructions, embodied in the computer-readable storage medium.

In an example embodiment, a method is provided, which may comprise receiving data related to a remote desktop protocol session. The method of this example embodiment may further comprise providing for storage of the data at a location other than the device associated with the remote desktop protocol client of the remote desktop protocol session. The method of this example embodiment may further comprise receiving a request to reproduce the remote desktop protocol session. Additionally, the method of this example embodiment may comprise retrieving the data from storage. The method of this example embodiment may further comprise facilitating reproduction of the remote desktop protocol session based at least in part on the retrieved data.

The data of this example method may comprise an indication of at least one of an event, action, or input associated with the remote desktop protocol session. Receiving data related to a remote desktop protocol session, according to the method of this example embodiment, may further comprise receiving data from a first device associated with the remote desktop protocol client of the remote desktop protocol session; and receiving data from a second device associated with the remote desktop protocol server of the remote desktop protocol session. As another example, the data of the example method may be encrypted for secure transmission. In this example embodiment, the method of this example embodiment may further comprise receiving a first key for decrypting the data received from the first device; and receiving a second key for decrypting the data received from the second device. The method of this example embodiment may further comprise modifying the data prior to providing for storage of the data, wherein modifying the data comprises at least one of compressing and indexing the data. Facilitating reproduction of the remote desktop protocol session, according to the method of this example embodiment, may further comprise providing the retrieved data as input to a remote desktop protocol client; and suppressing user input to the remote desktop protocol client during reproduction.

In another example embodiment, an apparatus comprising at least one processor and at least one memory storing computer program code is provided. The at least one memory and stored computer program code may be configured, with the at least one processor, to cause the apparatus of this example embodiment to at least receive data related to a remote desktop protocol session. The at least one memory and stored computer program code may be configured, with the at least one processor, to further cause the apparatus of this example embodiment to provide for storage of the data at a location other than the device associated with the remote desktop protocol client of the remote desktop protocol session. The at least one memory and stored computer program code may be configured, with the at least one processor, to additionally cause the apparatus of this example embodiment to receive a request to reproduce the remote desktop protocol session. The at least one memory and stored computer program code may be configured, with the at least one processor, to further cause the apparatus of this example embodiment to retrieve the data from storage. The at least one memory and stored computer program code may be configured, with the at least one processor, to additionally cause the apparatus of this example embodiment to facilitate reproduction of at least a portion of the remote desktop protocol session based at least in part on the retrieved data.

The data of this example may comprise an indication of at least one of an event, action, or input associated with the remote desktop protocol session. Receiving data related to a remote desktop protocol session, according to this example embodiment, may further comprise receiving data from a first device associated with the remote desktop protocol client of the remote desktop protocol session; and receiving data from a second device associated with the remote desktop protocol server of the remote desktop protocol session. As another example, the data of the example may be encrypted for secure transmission. In this example embodiment, the at least one memory and stored computer program code may be configured, with the at least one processor, to further cause the apparatus of this example embodiment to receive a first key for decrypting the data received from the first device; and receive a second key for decrypting the data received from the second device. The at least one memory and stored computer program code may be configured, with the at least one processor, to further cause the apparatus of this example embodiment to modify the data prior to providing for storage of the data, wherein modifying the data comprises at least one of compressing and indexing the data. Facilitating reproduction of the remote desktop protocol session, according to the example embodiment, may further comprise providing the retrieved data as input to a remote desktop protocol client; and suppressing user input to the remote desktop protocol client during reproduction.

In another example embodiment, a computer program product is provided. The computer program product of this example embodiment may include at least one computer-readable storage medium having computer-readable program instructions stored therein. The program instructions of this example embodiment may comprise program instructions configured to receive data related to a remote desktop protocol session. The program instructions of this example embodiment may further comprise program instructions configured to provide for storage of the data at a location other than the device associated with the remote desktop protocol client of the remote desktop protocol session. The program instructions of this example embodiment may additionally comprise program instructions configured to receive a request to reproduce the remote desktop protocol session. The program instructions of this example embodiment may further comprise program instructions configured to retrieve the data from storage. The program instructions of this example embodiment may additionally comprise program instructions configured to facilitate reproduction of at least a portion of the remote desktop protocol session based at least in part on the retrieved data.

The data of this example may comprise an indication of at least one of an event, action, or input associated with the remote desktop protocol session. Receiving data related to a remote desktop protocol session, according to this example embodiment, may further comprise receiving data from a first device associated with the remote desktop protocol client of the remote desktop protocol session; and receiving data from a second device associated with the remote desktop protocol server of the remote desktop protocol session. As another example, the data of the example may be encrypted for secure transmission. In this example embodiment, the program instructions of this example embodiment may further comprise program instructions configured to receive a first key for decrypting the data received from the first device; and receive a second key for decrypting the data received from the second device. The program instructions of this example embodiment may further comprise program instructions configured to modify the data prior to providing for storage of the data, wherein modifying the data comprises at least one of compressing and indexing the data. Facilitating reproduction of the remote desktop protocol session, according to this example embodiment, may further comprise providing the retrieved data as input to a remote desktop protocol client; and suppressing user input to the remote desktop protocol client during reproduction.

In another example embodiment, an apparatus is provided, which may comprise means for receiving data related to a remote desktop protocol session. The apparatus of this example embodiment may further comprise means for providing for storage of the data at a location other than the device associated with the remote desktop protocol client of the remote desktop protocol session. The apparatus of this example embodiment may additionally comprise means for receiving a request to reproduce the remote desktop protocol session. The apparatus of this example embodiment may further comprise means for retrieving the data from storage. The apparatus of this example embodiment may additionally comprise means for facilitating reproduction of at least a portion of the remote desktop protocol session based at least in part on the retrieved data.

The data of this example may comprise an indication of at least one of an event, action, or input associated with the remote desktop protocol session. Means for receiving data related to a remote desktop protocol session, according to this example embodiment, may further comprise receiving data from a first device associated with the remote desktop protocol client of the remote desktop protocol session; and receiving data from a second device associated with the remote desktop protocol server of the remote desktop protocol session. As another example, the data of the example may be encrypted for secure transmission. In this example embodiment, the apparatus of this example embodiment may further comprise means for receiving a first key for decrypting the data received from the first device; and means for receiving a second key for decrypting the data received from the second device. The apparatus of this example embodiment may further comprise means for modifying the data prior to providing for storage of the data, wherein modifying the data comprises at least one of compressing and indexing the data. Means for facilitating reproduction of the remote desktop protocol session, according to this example embodiment, may further comprise means for providing the retrieved data as input to a remote desktop protocol client; and means for suppressing user input to the remote desktop protocol client during reproduction.

In another example embodiment, a system is provided. The example system may comprise a first device configured to operate a remote desktop protocol client. Furthermore, the example system may comprise a second device configured to operate a remote desktop protocol server. The system according to this example embodiment may further comprise a third device located in a network path between the first and second devices. The third device may be configured to receive and store data transmitted by the first and second devices during a remote desktop protocol session.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed is:

1. A method comprising:
receiving data related to activities of a remote desktop client session executed on a terminal apparatus, the data comprising all keystrokes entered at the remote desktop client session and copies of documents saved in the remote desktop client session;
indexing the data based on events, the events comprising file creation and file storage;
storing the data at a server other than the terminal apparatus of the remote desktop client session using a first timestamp and a second timestamp;
receiving a request to reproduce at least of portion of the remote desktop client session;
retrieving at least a portion of the data relating to the remote desktop client session from storage; and
presenting the retrieved data at the indexed event for reproduction of the requested remote desktop client session based at least in part on the retrieved data, wherein the first timestamp is used for playback of the retrieved data at a rate of generating the data at the terminal apparatus and the second timestamp is used for playback of the retrieved data at a rate of receiving the data at the server.

2. The method of claim 1, where the step of storing the data is triggered by at least one of an event, action or input associated with the remote desktop client session.

3. The method of claim 1, wherein the step of receiving the data further comprises receiving data from the terminal apparatus associated with the remote desktop client session and receiving data from the server for the remote desktop client session.

4. The method of claim 3, the method further comprising the step of encrypting the data for secure transmission.

5. The method of claim 4, the method further comprising receiving a first key for decrypting the data received from the terminal apparatus and receiving a second key for decrypting the data received from the server.

6. The method of claim 1, the method further comprising modifying the data prior to the storing step, wherein modifying the data comprises compressing the data.

7. The method of claim 1, wherein the step of presenting the retrieved data for reproduction of the remote desktop client session further comprises:
providing the retrieved data as input to a terminal apparatus for another remote desktop client; and
suppressing user input to the terminal apparatus for the another remote desktop client during reproduction.

8. An apparatus comprising:
at least one processor; and
at least one memory storing computer program code, wherein the at least one memory and stored computer program code are configured, with the at least one processor, to cause the apparatus to,
receive data related to a remote desktop client session executed on a terminal apparatus, the data comprising all keystrokes entered at the remote desktop client session and copies of documents saved in the remote desktop client session,
index the data based on events, the events comprising file creation and file storage,
store the data at a server other than the terminal apparatus of the remote desktop client session using a first timestamp and a second timestamp,
receive a request to reproduce at least a portion of the remote desktop client session,
retrieve at least a portion of the data relating to the remote desktop client session from storage, and
present the retrieved data at the indexed event for reproduction of the requested remote desktop client session based at least in part on the retrieved data, wherein the first timestamp is used for playback of the retrieved data at a rate of generating the data at the terminal apparatus and the second timestamp is used for playback of the retrieved data at a rate of receiving the data at the server.

9. The apparatus of claim 8 wherein the apparatus is triggered to store the data by at least one of an event, action, or input associated with the remote desktop client session.

10. The apparatus of claim 8 wherein the apparatus receives data from the terminal apparatus associated with the remote desktop client session and receives data from the server for the remote desktop client session.

11. The apparatus of claim 10 wherein the data are encrypted for secure transmission.

12. The apparatus of claim 11 further comprising a first key for decrypting the data received from the terminal apparatus and a second key for decrypting the data received from the server.

13. The apparatus of claim 8 wherein the data are compressed before storage.

14. A computer program product comprising:
at least one computer-readable storage medium having computer-readable program instructions stored therein, wherein the program instructions are configured to;
receive data related to a remote desktop client session executed on a terminal apparatus, the data comprising all keystrokes entered at the remote desktop client session and copies of documents saved in the remote desktop client session,
index the data based on events, the events comprising file creation and file storage,
store the data at a server other than the terminal apparatus of the remote desktop client session using a first timestamp and a second timestamp,
receive a request to reproduce at least a portion of the remote desktop client session,
retrieve at least a portion of the data relating to the remote desktop client session from storage,
and
present the retrieved data at the indexed event for reproduction of the requested remote desktop client session based at least in part on the retrieved data, wherein the first timestamp is used for playback of the retrieved data at a rate of generating the data at the terminal apparatus and the second timestamp is used for playback of the retrieved data at a rate of receiving the data at the server.

15. The computer program product of claim 14 wherein the computer program product is triggered to store the data by at least one of an event, action, or input associated with the remote desktop client session.

16. The computer program product of claim 14 wherein the computer program product receives data from the terminal apparatus associated with the remote desktop client session and receives data from the server for the remote desktop client session.

17. The computer program product of claim 14 wherein the data are encrypted for secure transmission.

18. The computer program product of claim 17, further comprising a first key for decrypting the data received from the terminal apparatus and the program instructions further receiving a second key for decrypting the data received from the server.

* * * * *